United States Patent [19]

Epperly

[11] 4,287,652
[45] Sep. 8, 1981

[54] BRAKE SHOE SALVAGING MEANS

[76] Inventor: Harrison R. Epperly, 8050 E. State Rd., Zionsville, Ind. 46077

[21] Appl. No.: 136,975

[22] Filed: Apr. 3, 1980

[51] Int. Cl.³ .............................................. B23P 15/18
[52] U.S. Cl. ....................................... 29/233; 29/252
[58] Field of Search ..................... 29/233, 252; 83/510, 83/511, 512, 566, 569

[56] References Cited

U.S. PATENT DOCUMENTS 4,065,843  1/1978  Elola ................................... 29/233

Primary Examiner—James L. Jones, Jr.
Attorney, Agent, or Firm—Robert A. Spray

[57] ABSTRACT

A brake shoe salvaging means, by which a forced relative rocking of a brake shoe table and a battery of ejection pins is provided, the pins being supported in a pattern corresponding to the location of rivet holes in the brake shoe table; and thus the rocking brings into register, successively or sequentially, the ejection pin or pins which eject the corresponding rivet or rivets, thus salvaging the brake shoe table for a replacement brake lining.

10 Claims, 5 Drawing Figures

BRAKE SHOE SALVAGING MEANS

The present invention relates to a brake shoe salvaging means, by which the brake shoe table member may be made ready for re-use with a replacement brake lining, by removal of the rivets which had held the now-wornout brake lining to the brake shoe table.

In use of brakes, the portion called the brake lining is the portion which is worn away by the friction of the braking efforts; and the lining-supporting component, called the brake shoe table, receives hardly any detrimental wear at all. Thus, the brake shoe table component is a salvagable part of significant value; and for many years an effective mechanism has been needed to achieve the salvaging procedure satisfactorily.

Concepts of the invention provide for salvaging of the brake shoe table effectively and efficiently by providing that the entire set of the many rivets may be quickly and conveniently ejected from the brake shoe table in a single mechanized procedure, without harm to the brake shoe table and with but little handling thereof.

The concepts of the present invention also provide that the brake shoe table may be thus mechanically removed of its rivets even though the brake shoe table is of a somewhat awkward shape for a workpiece, i.e., the shape of a segment of a cylinder, and even though the holes in which the rivets are embedded are not parallel; and the concepts utilize that non-flat shape and the non-parallelism of the rivet holes in the kinematic scheme of the operational mechanism.

More particularly, the inventive concepts provide a mechanism by which forceful or pressure means are caused to achieve an operative relative rocking of the brake shoe table and an ejector plate means, the ejector plate means having a pattern of ejector pins carried thereon, thus causing, sequentially or successively, corresponding portions of the brake shoe table rivet holes and the ejector pins to come into forceful contact, thereby successively driving from their rivet holes successive ones or groups of the rivets of the brake shoe table.

The concepts of the invention further provide an abutment means which provides a locator which serves to locate the brake shoe table relative to the pattern of ejector pins of the ejector plate, so that the ejector pins and the rivet holes of the brake shoe table are positively brought into operative registry during action of the rivet-ejector mechanism.

Further, the concepts of the invention provide a pair of inter-related pressure means, one of which provides a forceful pressing together of the brake shoe table and the ejector plate, and the other of which serves to provide or achieve a forced swinging action of the first pressure means, thereby achieving the operative relative rocking effect which successively or sequentially ejects a rivet or set of rivets from the arcuate brake shoe table.

Prior art, discovered on a search after the present invention, is represented by the Elola patent (U.S. Pat. No. 4,065,843). It, as it appears, has a power press member adapted to move toward punches which are in a curved member supported by a curved anvil. Apparently the press pushes the punches outwardly, apparently thereby pushing out the broken rivet heads. However, Elola provides no relative rocking motion, which is a key concept here; and Elola's power stroke is radial, without the swinging which is also a key concept here, and Elola's swinging seems to relate solely to a preliminary position of the parts. Further, having a straight radial push effect instead of a relative rocking, the Elola device appears considerably complex in comparison to the present invention.

The above description of the present invention is of introductory and somewhat generalized form. More particular details, features, concepts, and advantages of the constructional and operational features of concepts of the present invention will further be apparent and understood from the following more detailed description of an illustrative embodiment thereof, taken in conjunction with the accompanying somewhat schematic drawings in which.

Figure 2:
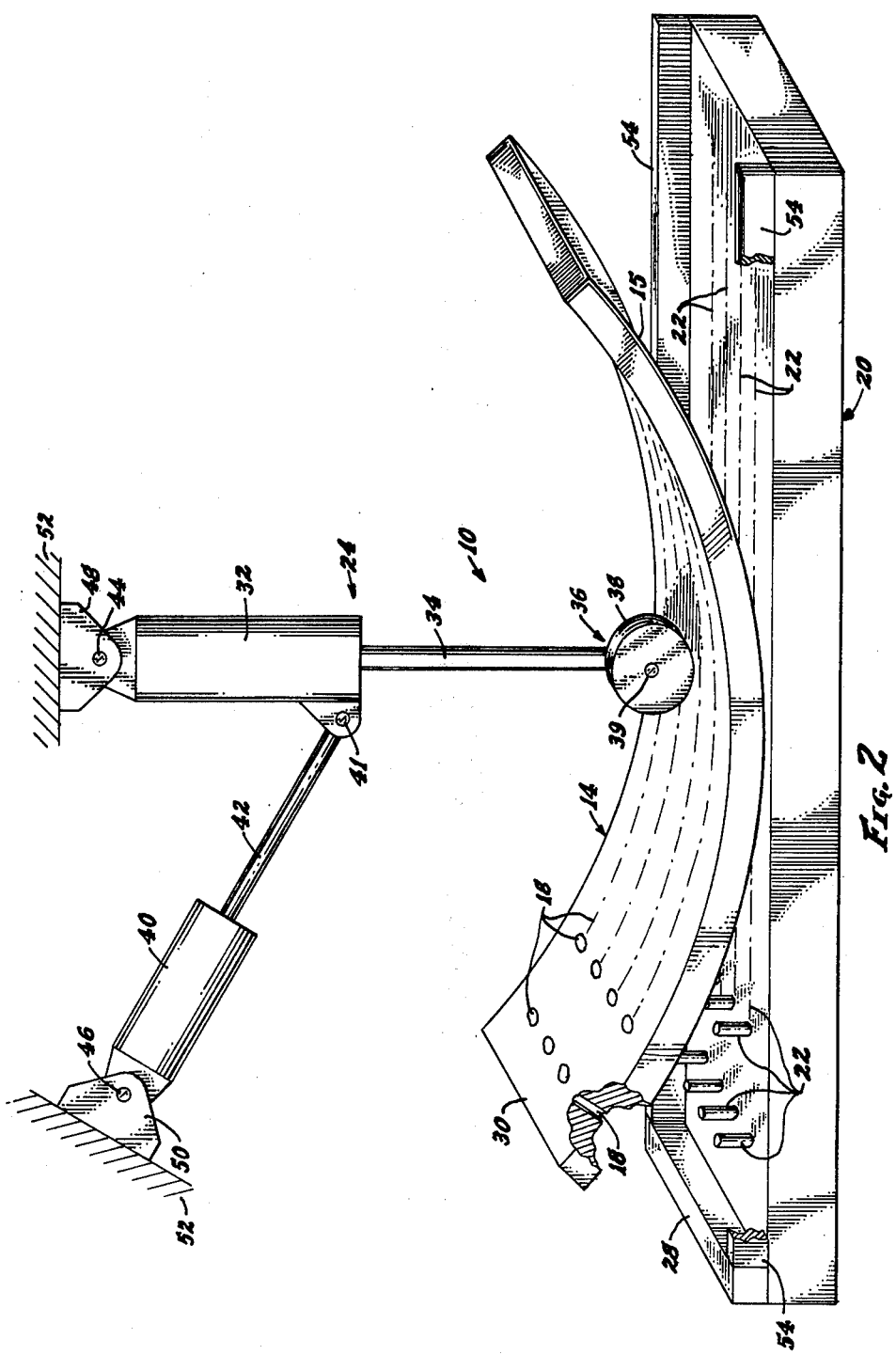
FIG. 2 is a pictorial view of the mechanism of FIG. 1, but with the parts in an intermediate stage of the operation.

(In the drawings, clarity and drafting convenience is achieved by conventionally showing portions as broken away to illustrate details otherwise hidden; and chain lines are shown in FIG. 2 to indicate repeating series of rivet holes and ejector pins.)

As shown in the drawings, the inventive concepts provide a brake shoe salvaging means 10 for removing rivets 12 from a brake shoe table 14, for the replacement of the brake lining 16 thereof.

A brake shoe table 14 is generally in the form of an arc of a cylinder; and, to the outer or convex side 15 of the brake shoe table 14, a replaceable brake lining 16 is held by rivets 12 which extend from the brake lining 16 through holes 18 provided in the brake shoe table 14 in a radial direction with respect to the cylindrical nature of the brake shoe table 14.

Figure 3:
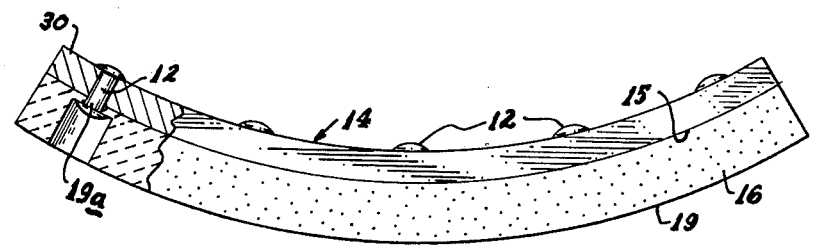
FIG. 3 is side elevational view of a complete brake shoe, having the brake lining and the brake shoe table held by rivets.
Figure 4:
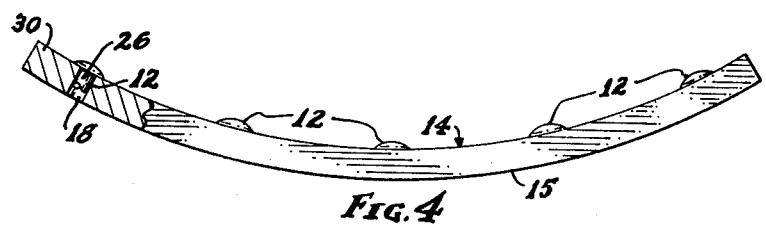
FIG. 4 is a side elevational view of the brake shoe table showing its rivets still embedded therein even though the replaceable brake lining has been totally worn away.
Figure 5:
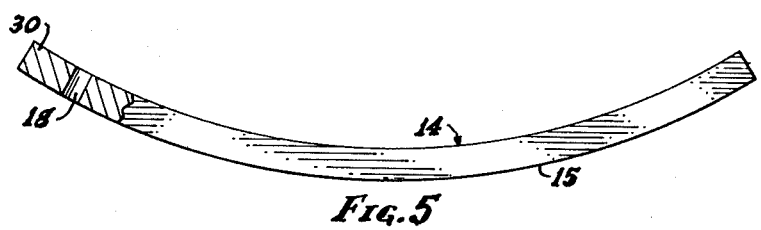
FIG. 5 is a side elevational view of the brake shoe table after the salvaging operation, its rivet holes now having been cleared of the rivets by having had them ejected by the salvaging mechanism of this invention.

FIG. 3 illustrates a complete brake shoe assembly, with a full lining 16 riveted to the table 14. The "brake wear" is the wearing down of the outer surface 19 of the brake lining 16 in the use of the brakes. When the lining 16 is completely "worn out", it is completely worn away, as illustrated by the condition shown in FIG. 4, but the wearing of the lining 16 will have worn away only the portion of the rivet 12 which was in the brake lining 16.

As herein set forth, the brake shoe salvaging means 10 comprises, as its general components, a plate means 20, means supporting the brake shoe table 14 and the plate means 20 in an operative juxtaposition, as is hereinafter set forth, and power or pressure means described below which achieves a forced relative rocking of the brake shoe table 14 and the plate means 20.

The plate means is shown as having a pattern of pin means 22 facing the brake shoe table 14; and the pins 22 are arranged in a pattern operatively corresponding to the pattern of rivet holes 18 in the brake shoe table 14.

Figure 1:
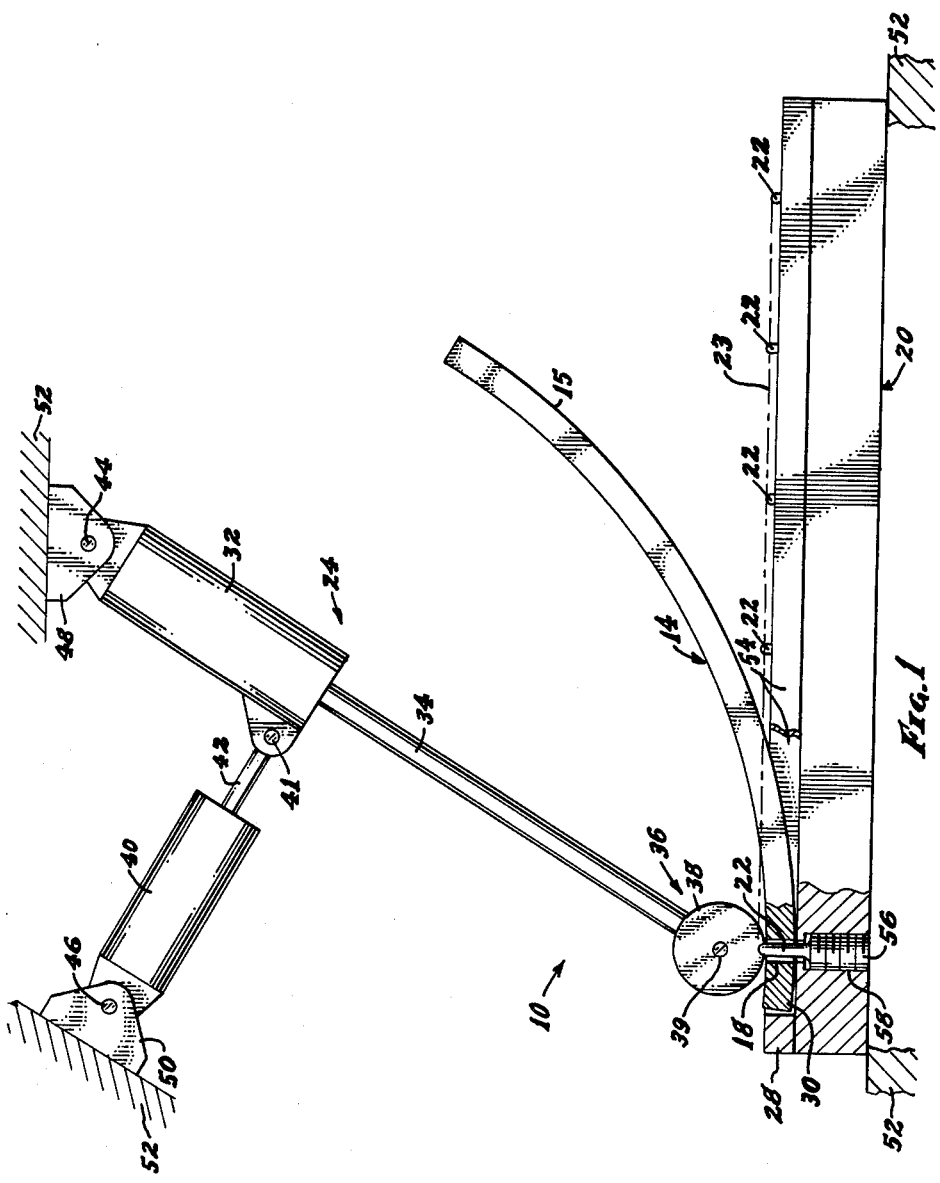
FIG. 1 is a side elevational view of an embodiment of the present invention, with a brake shoe table having been positioned against a locating abutment of the ejector plate, and with the end rivet (or row of rivets) having already been ejected from the brake shoe table, the parts shown in their relative position at that stage of the rivet-ejection operation.

As indicated by FIGS. 1 and 2, it will be noted that the pin means 18 have their outer ends in a plane 23, or in the form of a curved surface whose curvature differs from that of the brake shoe table 14; and pressure means 24 urges the brake shoe table 14 and the plate means 20 operatively toward one another in a forceful manner, this being of a nature operative to force the pin means 22 operatively through the corresponding rivet holes 18 of the brake shoe table 14, thereby driving from the plate-holes 18 the remaining portion 26 of the rivets 22. (It is not meant that the plane or surface 23 is precisely a plane or surface in a geometric sense; rather it is in the general sense considering the operativity, the ends of pins 22 being high enough to assure full ejection of the rivets 12(26), yet not so high as to obstruct the rocking action herein explained.)

More particularly, it will be noted that the pressure means 24 causes an operative relative rocking of the brake shoe table 14 and the plate means 20; and this forced rocking sequentially causes, successively, corresponding portions of the brake shoe table rivet holes 18 and pin means 22 to come into the forceful-manner contact, this thereby successively driving from their rivet holes 18 successive ones or groups of the rivets 22 of the brake shoe table 14.

In the embodiment illustrated, the support of the brake shoe table 14 and the plate means 20 in their operative juxtaposition is the action upon the plate means 20 by the pressure means 24 which, acting against the plate 20, acts to impose a compressive force through the brake shoe table 14, as the pressure means 24 operatively pushes against the brake shoe table 14.

More particularly, in the form shown, the means which support the brake shoe table 14 and the plate means 20 in their operative juxtaposition is the plate means 20 being below and supporting the brake shoe table 14 in action of the device.

Operative to correctly locate the brake shoe table 14 in the device 10, the plate means 20 is shown provided with abutment means 28 which provides a locator. That is, when an end 30 of the brake shoe table 14 is placed in abutting relationship against the locator abutment 28, the abutment 28 serves to locate the brake shoe table 14 relative to the pin means 22, the positive locating assuring them to be in a relative position such that the rivet holes 18 of the brake shoe table 14 and the corresponding pin means 22 are brought into operative registry during action of the pressure means 24.

The pressure means 24 is shown as including a power cylinder means 32 having a powered shaft 34 having pressure means 36, shown as a roller 38, for operatively pressing against the brake shoe table 14 for achieving the forceful engagement of the power shaft 34 with the brake shoe table 14 and the consequent forced rocking of table 14 relative to the plate 20. Pin 39 rotatably carries roller 38 on shaft 34.

For achieving the forced rocking action, there is shown a second power cylinder means 40 which is operatively connected at pin 41 to the other pressure means 32 by a powered shaft 42, achieving a forced swinging action of that pressure means 32, thereby achieving the operative relative rocking effect, both cylinders 32 and 40 being shown as pinned respectively at 44 and 46 to brackets 48 and 50 fixedly mounted onto suitable framing 52.

The forced relative rocking action of table 14 and plate 20 is seen in the illustrative embodiment to be that of a rocking of the brake shoe table 14, with the plate means 20 being stationary and non-movable with respect to the framing 52 to which the two pressure cylinders are pivotally supported, by resting on fixed framing 52.

During the ejection procedure, upstanding side rails 54 locate the brake shoe table 14 laterally with respect to the ejector plate 20, maintaining proper registration of ejector pins 22 and rivet holes 18 with respect to lateral positioning.

The ejector pins 22 are indicated in FIG. 1 as desirably formed as replaceable parts, in the form of shanks which are upstanding from a threaded bolt-like member 56 which is screw-threadly carried in a vertical opening 58 provided in the ejector plate 20.

It is thus seen that a brake shoe salvage means or mechanism according to the inventive concepts provides a desired and advantageous device, yielding the high advantages and economy of effective salvaging of brake shoe tables after their linings have been worn out.

Accordingly, it will thus be seen from the foregoing description of the invention according to this illustrative embodiment, considered with the accompanying drawings, that the present invention provides new and useful concepts of a brake shoe salvaging means for salvaging the brake shoe table component of brake shoes, yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. A brake shoe salvaging means for removing rivets from a brake shoe table for replacement of the brake lining thereof, the brake shoe table being generally in the form of an arc of a cylinder, to the outer or convex side of which a replaceable brake lining is held by rivet means which extend from the brake lining through holes provided in the brake shoe table in a radial direction with respect to the cylindrical nature of the brake shoe table, the brake shoe salvaging means comprising:

a plate means;

means supporting the brake shoe table and plate means in operative juxtaposition as hereinafter set forth;

the plate means having a pattern of pin means facing the brake shoe table and arranged in a pattern operatively corresponding to the pattern of rivet holes in the brake shoe table;

the pin means having their outer ends in a plane or in the form of a curved surface whose curvature differs from that of the brake shoe table;

pressure means urging the brake shoe table and plate means operatively toward one another in a forceful manner operative to force the pin means operatively through the corresponding rivet holes of the brake shoe table to thereby drive the rivets therefrom; and pressure means causing an operative relative rocking of the brake shoe table and the plate means to cause, sequentially or successively, corresponding portions of the brake shoe table rivet holes and pin means to come into the said forceful manner contact, thereby to successively drive from their rivet holes successive ones or groups of the rivets of the brake shoe table.

2. The invention as set forth in claim 1 in a combination in which the means which support the brake shoe table and the plate means in the said operative juxtaposition is the plate means and the first-named pressure means which co-operatively act to impose a compressive force through the brake shoe table.

3. The invention as set forth in claim 1 in a combination in which the means which support the brake shoe table and the plate means in the said operative juxtaposition is the action of the first-named pressure means operatively pushing against the brake shoe table.

4. The invention as set forth in claim 1 in a combination in which the means which support the brake shoe table and the plate means in the said operative juxtaposition is the plate means being below and supporting the brake shoe table.

5. The invention as set forth in claim 1 in a combination in which the plate means is provided with abutment means which provides a locator which, when an end of the brake shoe table is placed in abutting relationship thereagainst, serves to locate the brake shoe table relative to the pin means in a relative position such that the rivet holes of the brake shoe table and the corresponding pin means are brought into operative registry during action of the two pressure means specified.

6. The invention as set forth in claim 1 in a combination in which the first-named pressure means includes a power cylinder means having a powered shaft having pressure means for operatively pressing against the brake shoe table for achieving the forceful engagement therewith of its said operativity.

7. The invention as set forth in claim 1 in a combination in which the second-named pressure means includes a power means which is operatively connected to the said first named pressure means in a manner by which is achieved a forced swinging action of the first-named pressure means thereby achieving the said operative relative rocking effect.

8. The invention as set forth in claim 6 in a combination in which the second-named pressure means includes a power means which is operatively connected to the power cylinder of the said first named pressure means in a manner by which is achieved a forced swinging action of the first-named pressure means thereby achieving the said operative relative rocking effect.

9. The invention as set forth in claim 6 in a combination in which the pressure means of the said first-named pressure means is a roller means rotatably connected to the end of the powered shaft.

10. The invention as set forth in claim 1 in a combination in which the operative relative rocking of the brake shoe table and plate means is a rocking of the brake shoe table, with the plate means being stationary and non-movable with respect to the means by which the two said pressure means are supported.

* * * * *

UNITED STATES PATENT AND TRADEMARK OFFICE
CERTIFICATE OF CORRECTION

PATENT NO. : 4,287,652
DATED : September 8, 1981
INVENTOR(S) : Harrison R. Epperly It is certified that error appears in the above—identified patent and that said Letters Patent is hereby corrected as shown below:

On the title page

The correct address of this Inventor is: 8050 E. State Road 334, Zionsville,, IN 46077

Signed and Sealed this

Twenth-eighth Day of September 1982

[SEAL]

Attest:

GERALD J. MOSSINGHOFF

Attesting Officer

Commissioner of Patents and Trademarks